United States Patent
Hellwig et al.

(10) Patent No.: US 12,001,357 B2
(45) Date of Patent: Jun. 4, 2024

(54) DIRECT MEMORY ACCESS CIRCUIT, MICROCONTROLLER, AND METHOD OF CONTROLLING A DIRECT MEMORY ACCESS

(71) Applicant: Infineon Technologies AG, Neubiberg (DE)

(72) Inventors: Frank Hellwig, Wunstorf (DE); Sandeep Vangipuram, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 205 days.

(21) Appl. No.: 17/686,445

(22) Filed: Mar. 4, 2022

(65) Prior Publication Data
US 2023/0281139 A1 Sep. 7, 2023

(51) Int. Cl.
| | | |
|---|---|---|
| G06F 13/16 | (2006.01) | |
| G06F 9/50 | (2006.01) | |
| G06F 13/28 | (2006.01) | |
| G06F 13/30 | (2006.01) | |

(52) U.S. Cl.
CPC ........ *G06F 13/1689* (2013.01); *G06F 9/5016* (2013.01); *G06F 13/1621* (2013.01); *G06F 13/28* (2013.01); *G06F 13/30* (2013.01)

(58) Field of Classification Search
CPC .............. G06F 9/5016; G06F 13/1689; G06F 13/1621; G06F 13/28; G06F 13/30
See application file for complete search history.

(56) References Cited

U.S. PATENT DOCUMENTS

| 8,880,756 | B1* | 11/2014 | Birsan | G06F 13/28 |
| | | | | 710/22 |
| 2002/0194401 | A1* | 12/2002 | Sakugawa | G06F 13/30 |
| | | | | 710/28 |
| 2003/0088718 | A1* | 5/2003 | Higuchi | G06F 13/28 |
| | | | | 710/6 |
| 2011/0320645 | A1* | 12/2011 | Hor | G06F 13/30 |
| | | | | 710/22 |
| 2015/0220460 | A1* | 8/2015 | Litch | G06F 13/1621 |
| | | | | 710/114 |

\* cited by examiner

*Primary Examiner* — Henry Tsai
*Assistant Examiner* — John B Roche
(74) *Attorney, Agent, or Firm* — Viering, Jentschura & Partner mbB (57) ABSTRACT

A direct memory access (DMA) circuit is provided. The DMA circuit may include a plurality of groups of direct memory access channels, wherein each of the groups includes at least one DMA channel and a resource usage counter configured to count an execution time in which one of the DMA channels of the group is executed, and an arbiter configured to evaluate a value of the resource usage counter of a group upon a request for execution time by one of the DMA channels of the group, and, taking into account a result of the evaluation, to assign, delay assignment, or deny execution time for using the direct memory access to one of the groups.

20 Claims, 5 Drawing Sheets

FIG. 1A

Prior Art

FIG. 1B

Prior Art

FIG. 2

DIRECT MEMORY ACCESS CIRCUIT, MICROCONTROLLER, AND METHOD OF CONTROLLING A DIRECT MEMORY ACCESS

TECHNICAL FIELD

Various embodiments relate generally to a direct memory access circuit, to a microcontroller, and to a method of controlling a direct memory.

BACKGROUND

A microcontrol unit (MCU), for example a multi core MCU, may run multiple software applications in parallel. Some of the applications may have real-time requirements, and some of the applications may have special security requirements.

It may be required to ensure that an application can continue to run without restriction even if an error occurs in another application running in parallel. As a consequence, the applications are to be isolated from each other as far as possible.

The isolation is supposed to prevent or mitigate undesired side effects, like for example granting access to resources of the respective other application, and/or suppression of the other application on shared functions of the (multi core) MCU or MPU (e.g.: shared On Chip Interconnect, system direct memory access (DMA), Interrupt System)

SUMMARY

A direct memory access (DMA) circuit is provided. The DMA circuit includes a plurality of groups of direct memory access channels, wherein each of the groups comprises at least one DMA channel and a resource usage counter configured to count an execution time in which one of the DMA channels of the group is executed, and an arbiter configured to evaluate a value of the resource usage counter of a group upon a request for execution time by one of the DMA channels of the group and, taking into account a result of the evaluation, to assign or deny execution time for using the direct memory access to one of the groups.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

Figure 1A:
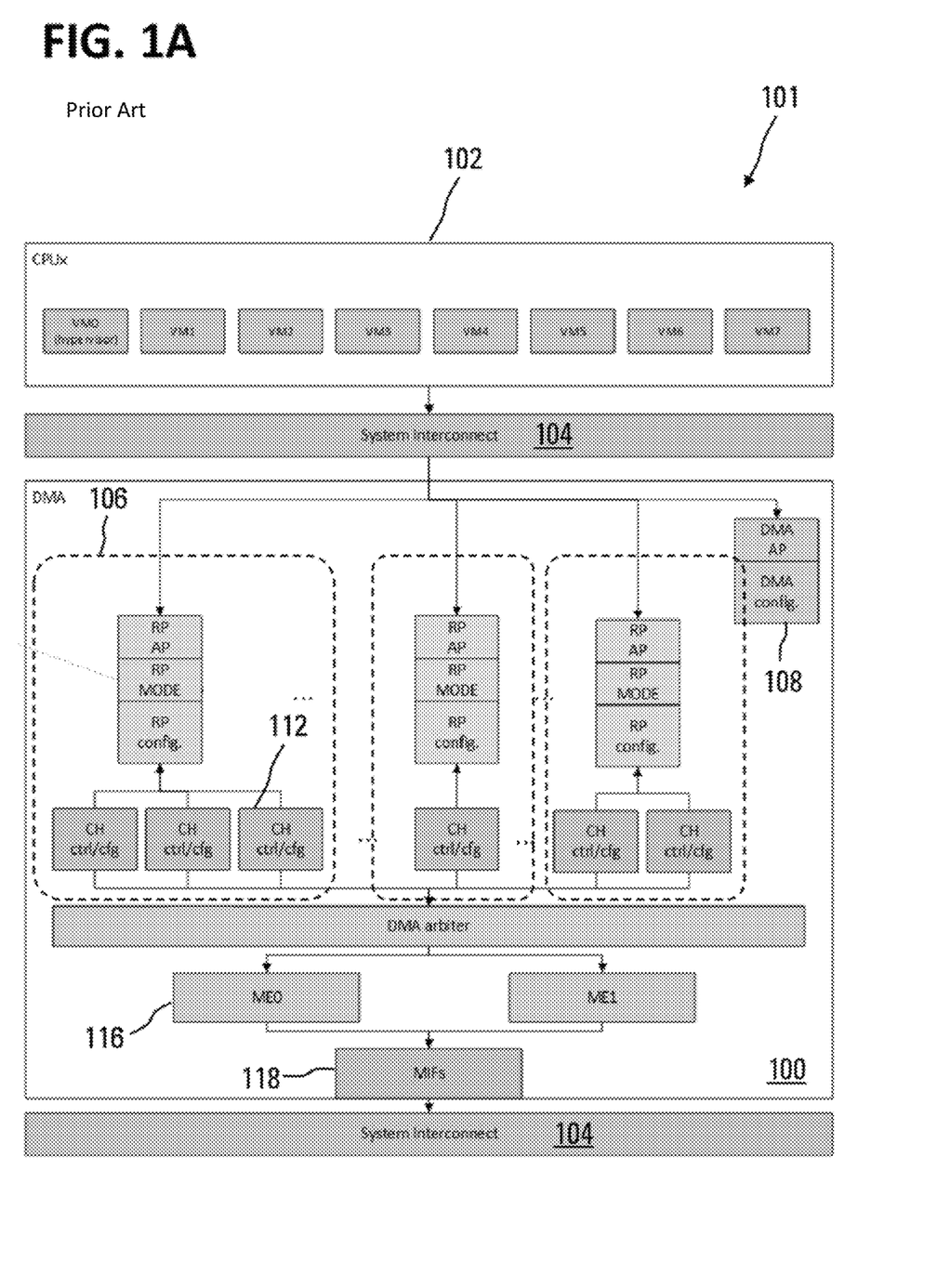
FIG. 1A shows a schematic illustration of a microprocessor including a direct memory access in accordance with a prior art.
Figure 1B:
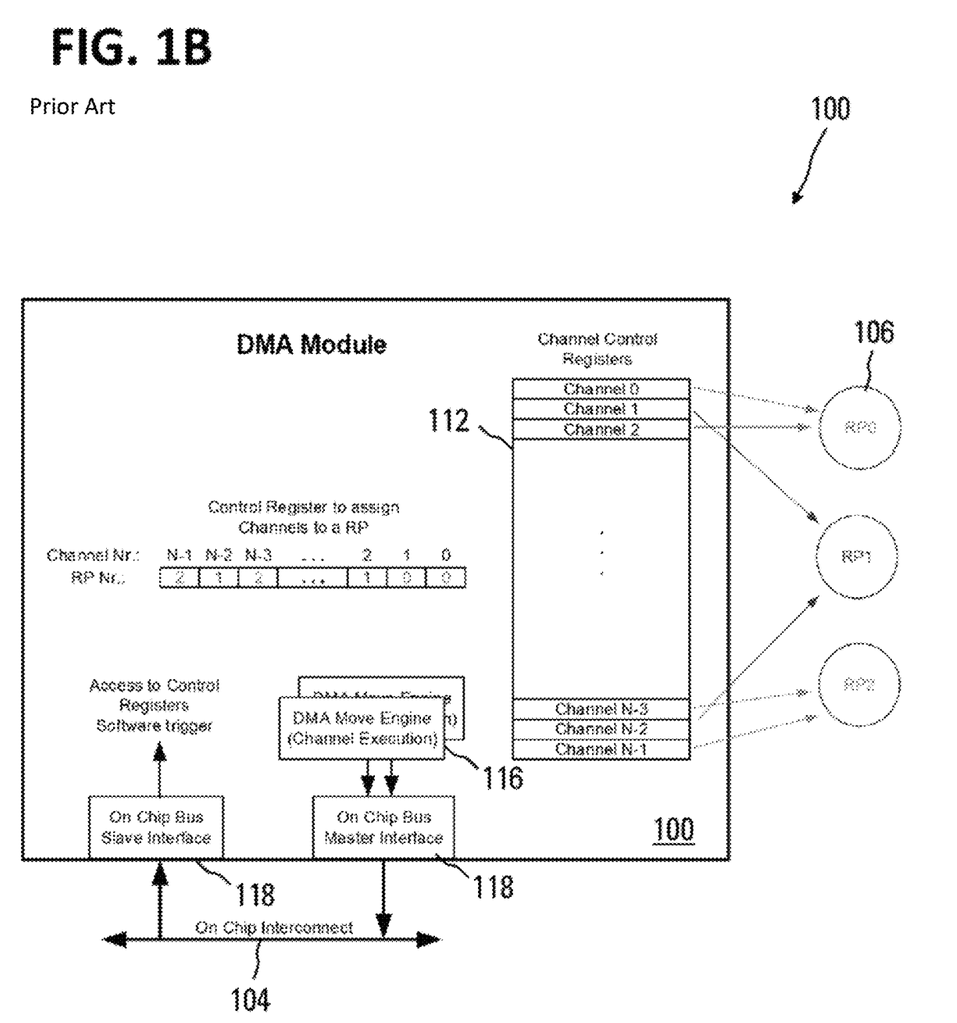
FIG. 1B shows a schematic illustration of a direct memory access in accordance with a prior art.

FIG. 1A illustrates a microcontroller 101 including a direct memory access circuit 100 in accordance with a prior art, and FIG. 1B shows a schematic illustration of a direct memory access 100 in accordance with a prior art.

A microcontrol unit 102, for example a multi core MCU, may run multiple software applications in parallel. In FIG. 1A the software applications may be provided, as an example, by virtual machines VM.

Since it may be too expensive in terms of space, leakage, and top-level wiring to maintain a separate direct memory access (DMA) for each of the several applications, a DMA 100 may be used as a shared resource. The microcontrol unit 102 and the DMA 100 may be connected via a system interconnect 104, for example a bus. The DMA circuit 100 may for example include a communication interface 118 for connecting to the system interconnect 104.

DMA channels 112, which may enable the direct memory access, may be assigned to the respective applications in accordance with a DMA configuration 108. As an illustrative way to describe it, the DMA channels 112 may be considered as organisational units assembling information that may be relevant for a processing of DMA access request, for example control- and configuration settings, etc. Terminologies used herein like "a DMA channel is pending execution" is to be understood to mean that an access request by an application (e.g., a request from a processor 102 to read data from the memory) that has been assigned to the DNA channel is pending execution.

DMA channels 112 may be grouped in organisational units 106 that are usually referred to as resource partitions (RPs) 106. A DMA 100 may provide multiple (e.g., n) resource partitions RPx, with x from 0 to n−1.

The DMA 100 may provide a dedicated access protection mechanism for each RPx 106 to control which master agent function is enabled for read/write access to the DMA channels 112 assigned to each of the resource partitions RPx.

For example, each of the resource partitions RPx may be assigned a unique transaction ID that may used for interconnect access by the DMA channels 112 that are assigned to the respective resource partition RPx.

The resource partition RPx mechanism may be used to assign configurable groups of channels to the different applications, wherein the resource partition RPx access protection mechanisms and the transaction IDs per RPx may provide the necessary freedom from interference of the applications on a system level.

DMA channels that are pending execution may compete for access to at least one "bottleneck", which, in case of a DMA, may for example be a so-called move engine, which is a state machine that executes a DMA channel that has previously been triggered.

This means that an arbitration may be applied, in order to define a sequence in which the DMA channels are granted access.

An option for arbitration of the channels pending execution may include providing each channel with a unique priority within the DMA. The channel number may, for example, be used for this purpose. In that case, pending channel(s) with the highest channel number may be executed next. Such a configuration may have an advantageous effect that it is possible to assign a mix of high and low priority channels to each of the resource partitions RPx. However, side effects on other resource partitions RPx may implicitly be caused.

According to another option, each channel may be provided with a unique priority within the RPx. The channel number may, for example, be used for this purpose. Thereby, a two level arbitration may be provided to decide which channel(s) are to be executed next: On a first arbitration level, among RPs with pending channels, and on a second arbitration level, among pending channels within a resource partition. The execution time may, for example, be assigned in accordance with a round robin scheme at the first level, and according to priority/channel number at the second level.

This may provide a clearer separation between individual applications. However, on the other hand, it is possible that only local optimum of time assignment is achieved, whereas, from a global perspective, time assignment may fail in typical scenarios, in that an application A may have, e.g., the highest priority interrupts pending (otherwise the applications may suffer from a buffer overflow), while the other applications may have only some non-critical channels pending.

Irrespective of the arbitration scheme that is used, it may be necessary to estimate beforehand how each application will utilize the DMA, on average but also with regard to a short-term high utilization the DMA, whenever the DMA is used as a shared resource, Thereby, it may be ensured that each application may be able to execute its DMA actions in time. How often the respective DMA channels are requested and how long they they are occupied may be defined by the associated application.

It may happen that an application uses the DMA for a longer time than previously assumed, and thus causes other applications to miss their deadlines.

Such a problem may be avoided by time-division multiplexing, in other words, by assigning to each of the resource partitions RPx a fixed time segment within a time interval. However, this may generally slow down the applications and may lead to a poor utilization of the MCU hardware.

Another approach to avoid the problem may be a provision of a dedicated DMA for each application. However, this may lead to high costs (due to the large amount of semiconductor area that may be required), a high system interconnect complexity, leakage, and also a poor utilization of the MCU hardware.

In various embodiments, a circuit and a method are provided that establish a mechanism for controlling a DMA involving monitoring activities of multiple applications on the shared DMA during runtime and reacting in a controlled manner when an application exceeds its allocated bandwidth on the DMA.

A time interval, for example in number of clock cycles, may be defined for the DMA. The DMA may include a plurality of DMA channel groups (also referred to as resource partition (RP), each of which may include one or more DMA channels, and wherein each group of DMA channels assigned to an application may be assigned a budget, e.g., an execution time budget, within the time interval. The budget, which may also be referred to as (DMA) bandwidth allocated to an application, may be defined as a number of clock cycles within the (pre-)defined time interval that the application may be estimated to use the resource, for example a number of clock cycles used for executing DMA channels (or rather, the applications assigned to the DMA channels) that are mapped to a respective resource partition RPx or to a group of resource partitions RPs.

A reaction of the DMA when an application on the DMA has exceeded its allocated budget may be configurable.

Figure 2:
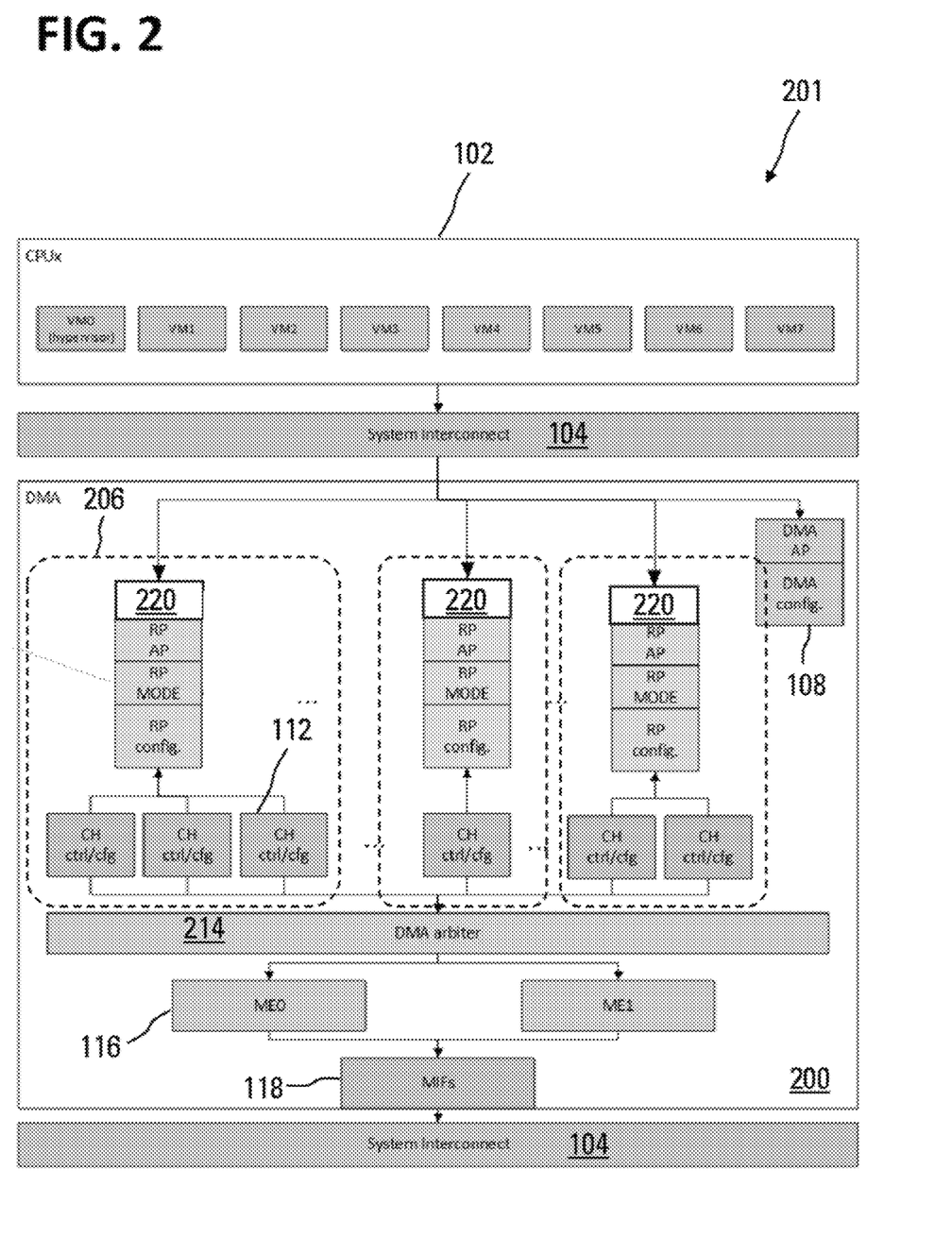
FIG. 2 shows a schematic illustration of a microprocessor including a direct memory access circuit in accordance with various embodiments.

FIG. 2 shows a schematic illustration of a microprocessor 201 including a direct memory access circuit 200 in accordance with various embodiments.

The direct memory access circuit 200 in accordance with various embodiments may regarding various aspects be similar to the prior art DMA circuit 100, except for the differences described herein, and a repetition of a description of the respective elements and/or features may be omitted.

The DMA circuit 200 may include a plurality of groups 206 of direct memory access channels 112, wherein each of the groups 206 may include at least one DMA channel 112 and a resource usage counter 220 configured to count an execution time (for example, in terms of clock units or other suitable time units) in which one of the DMA channels 112 of the group 206 is executed. The groups 206 may also be referred to as resource partitions (RP, if applicable, individually identified by added numerals) 206.

The DMA circuit 200 may further include an arbiter 214 configured to evaluate a value of the resource usage counter 220 of a group 206 upon a request for execution time by one of the DMA channels 112 of the group 206, and, taking into account a result of the evaluation, to assign, delay assignment, or deny execution time to one of the groups 206 for using the direct memory access, for example in particular a limiting element of the DMA circuit 100, for example a move engine 116.

In other words, the arbiter 214 may be configured to evaluate the value of the resource usage counter 220 of the group 206 whenever one of the DMA channels 112 of the group 206 requests execution time, and to assign or deny the execution time, or to delay (in other words, postpone) the assignment of execution time to the respective group 206.

Figure 3:
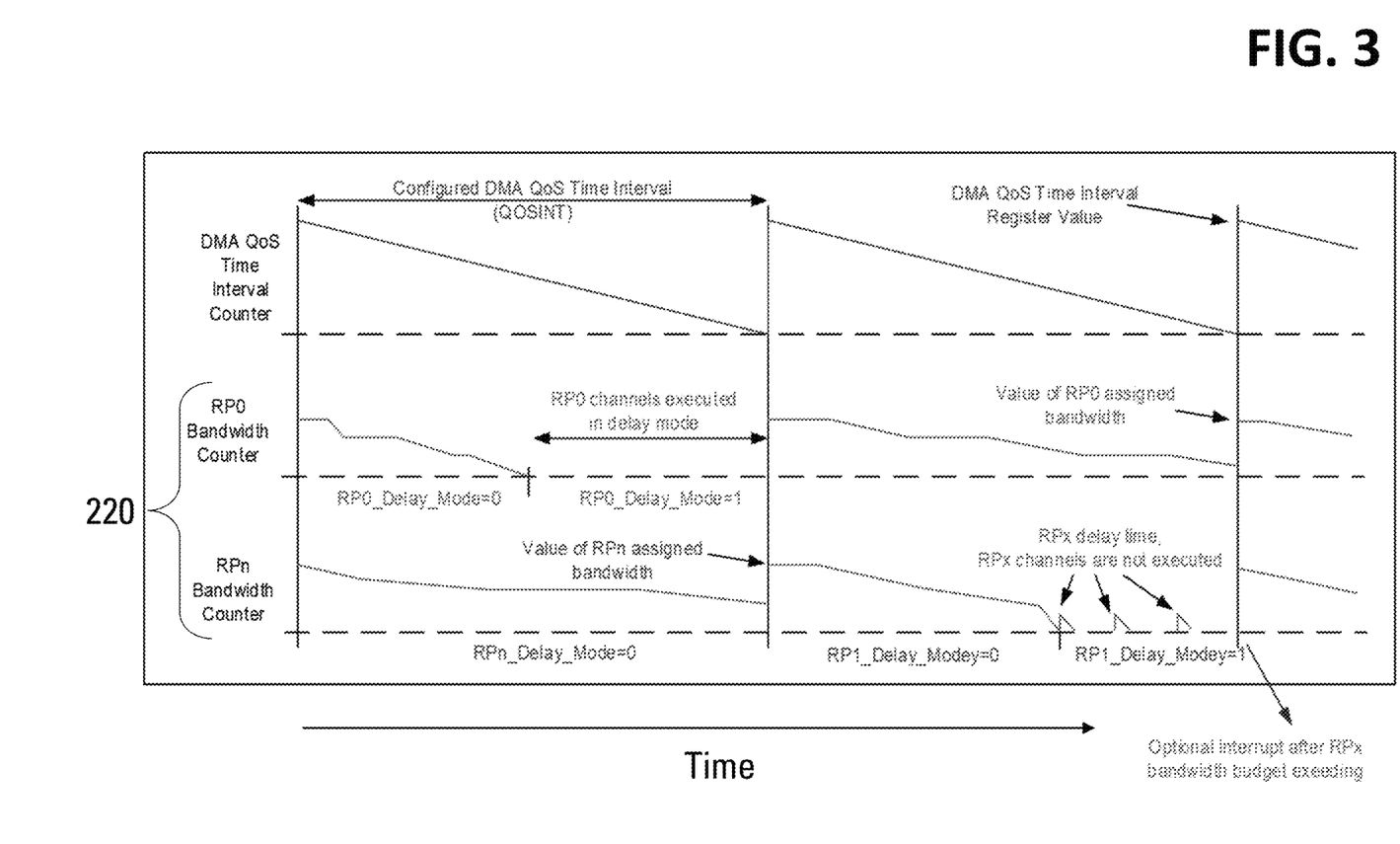
FIG. 3 illustrates a variation of different counters used in the DMA circuit in accordance with various embodiments with time.

The evaluation may include comparing the value of the resource usage counter 220 with a predefined threshold value. A variation of the value of the resource usage counter 220 with time for an exemplary embodiment are shown in FIG. 3. In the example, the threshold value may be a lower limit, for example zero, and the resource usage counter 220 may, after each reset, be set to a starting value above the predefined threshold value and count down while using execution time (e.g., using the move engine 116). In other examples, the resource usage counter 220 may be configured to be set to a low (e.g., zero) starting value, and to count up towards a higher threshold value.

As briefly described above, the access to the limited DMA resources (for example to the move engine(s) 116) may be controlled using a priority scheme. The arbiter 214 may be configured to grant the access to the DMA 200 in consideration of the priority scheme. In various embodiments, in a case where a plurality of DMA channels 112 are pending execution, the priority scheme may be used (e.g., by the arbiter 214) to define an order in which the pending DMA channels 112 may be executed. The DMA channels 112 may have fixed priority values, configurable priority values, or a mixture of fixed values and group configuration.

If the channels 112 of a resource partition RPx have exceeded their assigned DMA bandwidth within in a predefined time interval (in other words, their cumulative execution time, which may not necessarily be consecutive, may be longer than the time budget corresponding to the assigned DMA bandwidth, which may be defined by a difference of the threshold value and the starting value of the resource usage counter 220), one of a group of measures may be taken in response to the exceeded time budget. The selected measure may in various embodiments be continued until the end of the current time interval. FIG. 3 (top panel) shows as an example that the time interval may be predefined by a time interval counter counting linearly towards a threshold value, for example from a positive starting value towards a lower threshold, e.g., zero. When the time interval counter reaches its assigned threshold value, the time interval counter and the resource usage counter 220 may be reset to their respective starting values. In FIG. 3, this happens at the vertical lines.

In various embodiments, the selected measure may be that no RPx channels are executed until the end of the time interval.

In various embodiments, an interrupt may be signaled, e.g. to the affected application, in a case of denying execution. This may enable the application software to react in a suitable way.

In various embodiments, the DMA channels 112 of RPx may be assigned predefined alternative priorities.

DMA channels 112 of other RPs that have not used up their bandwidth yet may be assigned higher priorities and be therefore executed preferentially in various embodiments. FIG. 3 shows a visualization of such an exemplary situation in its left panels: While RP0 has used up its allocated bandwidth about halfway through the time interval, RPn has not yet reached the threshold value at the end of the time interval and was thus executed continuously (as indicated by the monotonically declining value of the resource execution counter 220) throughout the time interval.

In a case that no DMA channels 112 from RPs 206 with bandwidth reserve are pending, the pending channels from RPs 206 with the exceeded bandwidth may in various embodiments be executed according to the normal channel priority.

In a case that no DMA channels 112 from RPs 206 with bandwidth reserve are pending, the pending channels 112 from RPs 206 with the exceeded bandwidth may in various embodiments be executed according to the alternative channel priority.

In a case that no DMA channels 112 from RPs with bandwidth reserve are pending, the pending channels from RPs 206 with the exceeded bandwidth may in various embodiments be executed with a configurable delay until the end of the current time interval. This may for example be achieved using a delay counter that may start counting when the RPx channel was denied execution. When the delay counter has reached a threshold value, the arbiter may decide to execute the RPx channel despite the exceeded budget. An example of such a scenario is shown in FIG. 3 in the bottom right panel.

In an exemplary embodiment, when in delay mode, the following sequence may be executed: Wait until no more RPx channel 112 is executed. Do not start executing a new RPx DMA channel 112. Start RPx delay counter. Wait until RPx counter counts down. Consider RPx channels 112 again. Wait until exactly one RPx channel is selected and then mask RPx channels again. Wait until RPx channel 112 is executed. Go back to the beginning.

As soon as a DMA channel 112 comes into execution, it may block DMA resources (for example the "bottleneck" move engine ME) for a minimum time, since a read access that has been started may need to be completed with a write before it can be interrupted without causing problems. Through the configurable delay, this side effect may be controllable, and at the same time, channels of RPs 206 with exceeded bandwidth may be allowed to continue to run with a minimum bandwidth in order to prevent fatal errors (which may for example occur if a lack of execution led to a FIFO overflow or underflow in communication modules).

In various embodiments, the reaction of the DMA circuit when an application on the DMA has exceeded the budget allocated to it (or to the RP it is assigned to) may be configured separately for each application.

In various embodiments, the DMA circuit may be provided with a resource usage determination circuit instead of or in addition to the resource usage counter 220. The resource usage determination circuit may be configured to determine an execution time in which a respective one of the DMA channels of the group is executed, and to indicate the determined execution time or an information based on the execution time to the arbiter 214. For example, the resource usage determination circuit may itself be configured to determine whether the assigned bandwidth was exceeded or not, and provide the result to the arbiter 214.

In various embodiments, the DMA circuit 200 may be configured to store the value of each of the groups, for example in a memory element, before a reset of the resource usage counter. The stored values of each of the groups may be analyzed in the DMA circuit 200 and/or be provided to a processor (e. g., to a processor that may be external to the DMA circuit 200, for example a CPU) for analysis, and the threshold value and/or a reset value of the resource usage counter may be adjusted in accordance with a result of the analysis.

Figure 4:
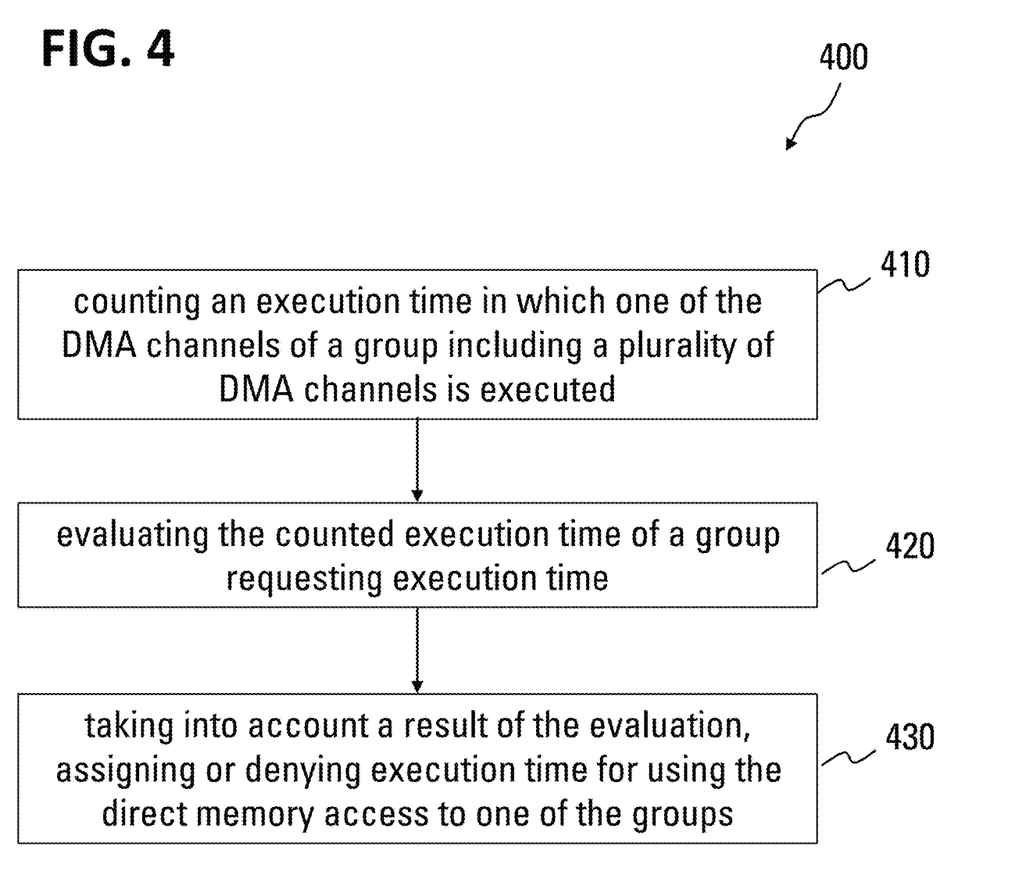
FIG. 4 shows a flow diagram of a method of controlling a direct memory access in accordance with various embodiments.

FIG. 4 shows a flow diagram 400 of a method of controlling a direct memory access in accordance with various embodiments. The direct memory access may include a plurality of groups of direct memory access channels, wherein each of the groups includes at least one DMA channel—

The method may include counting an execution time in which one of the DMA channels of the group is executed (in 410), evaluating the counted execution time of a group upon a request for execution time by one of the DMA channels of the group (in 420), and, taking into account a result of the evaluation, assigning, delaying assignment, or denying execution time for using the direct memory access to one of the groups (in 430).

Various examples will be illustrated in the following:

Example 1 is a direct memory access (DMA) circuit. The DMA circuit may include a plurality of groups of direct memory access channels, wherein each of the groups includes at least one DMA channel and a resource usage counter configured to count an execution time in which one of the DMA channels of the group is executed, and an arbiter configured to evaluate a value of the resource usage counter of a group upon a request for execution time by one of the DMA channels of the group and, taking into account a result of the evaluation, to assign, delay assigning, or deny execution time for using the direct memory access to one of the groups.

In Example 2, the subject-matter of Example 1 may optionally include that the evaluating includes comparing the value with a predefined threshold value.

In Example 3, the subject-matter of Example 1 or 2 may optionally include that each group further includes a delay time counter configured to start counting when delaying execution time, and that the arbiter is further configured to compare a value of the delay time counter of the group with a predefined second threshold value, and, if the value is identical to or exceeds the second predefined threshold value, to assign the execution time to the group.

In Example 4, the subject-matter of Example 3 may optionally include that the second threshold value is individually preconfigurable for each of the groups.

In Example 5, the subject-matter of any of Examples 2 to 4 may optionally include that the threshold value is individually preconfigurable for each of the groups, optionally for each of the plurality of channels and/or for each application assigned to a specific channel of the plurality of channels.

In Example 6, the subject-matter of any of Examples 1 to 5 may optionally include that the resource usage counter is configured as a register.

In Example 7, the subject-matter of any of Examples 2 to 6 may optionally include that the DMA circuit is further configured to reset the resource usage counter for each of the groups after a predefined time interval, wherein the predefined time interval is larger than a time span defined by the predefined threshold value.

In Example 8, the subject-matter of Example 7 may optionally further include a memory element, wherein the DMA circuit is configured to store the value of each of the groups in the memory element before the reset of the resource usage counter.

In Example 9, the subject-matter of Example 7 or 8 may optionally further include that the DMA circuit is configured to analyze the stored values of each of the groups and/or to provide the stored values to a processor for analysis, and to adjust the threshold value and/or a reset value of the resource usage counter in accordance with a result of the analysis.

In Example 10, the subject-matter of any of Examples 1 to 9 may optionally include that the arbiter is further configured to consider a ranking scheme for selecting one of the plurality of groups upon a request for execution time by one of the DMA channels of one of the plurality of groups for the evaluation of the value.

In Example 11, the subject-matter of any of Examples 3 to 10 may optionally further include a register and a storage mode indicator, wherein the register is configured as the resource usage counter until the value of the resource usage indicator reaches the threshold value, wherein the register is configured as the delay time counter after the value of the resource usage indicator has reached the threshold value, and wherein the storage mode indicator is configured to indicate whether the register is presently configured as the resource usage counter or as the delay time counter.

Example 12 is a microcontroller. The microcontroller may include a DMA circuit including a plurality of groups of direct memory access channels, wherein each of the groups comprises at least one DMA channel and a resource usage counter configured to count an execution time in which one of the DMA channels of the group is executed, an arbiter configured to evaluate a value of the resource usage counter of a group upon a request for execution time by one of the DMA channels of the group, and, taking into account a result of the evaluation, to assign or deny execution time for using the direct memory access to one of the groups, and at least one processor configured to execute at least one application requesting execution time for using the direct memory access.

Example 13 is a method of controlling a direct memory access including a plurality of groups of direct memory access channels, wherein each of the groups includes at least one DMA channel, the method including counting an execution time in which one of the DMA channels of the group is executed, evaluating the counted execution time of a group including a DMA channel requesting execution time, and, taking into account a result of the evaluation, assigning, delaying execution, or denying execution time for using the direct memory access to one of the groups.

In Example 14, the subject-matter of Example 13 may optionally include that the evaluating includes comparing the value with a predefined threshold value.

In Example 15, the subject-matter of Example 14 may optionally include that each group further includes a delay time counter, the method further including for the delaying the assigning of execution time to the group, comparing a value of the delay time counter of the first ranked group with a predefined second threshold value, and, if the value is identical to or exceeds the second predefined threshold value, assigning the execution time to the group.

In Example 16, the subject-matter of Example 14 or 15 may optionally further include individually preconfiguring the second threshold value for each of the groups.

In Example 17, the subject-matter of any of Examples 14 to 17 may optionally further include individually preconfiguring the threshold value for each of the groups.

In Example 18, the subject-matter of any of Examples 13 to 17 may optionally further include that the resource usage counter is configured as a register.

In Example 19, the subject-matter of any of Examples 14 to 18 may optionally further include resetting the resource usage counter for each of the groups after a predefined time interval, wherein the predefined time interval is larger than a time span defined by the predefined threshold value.

In Example 20, the subject-matter of Example 19 may optionally include that the DMA circuit further includes a memory element, the method further including storing the value of the resource usage of each of the groups in the memory element before resetting the resource usage counter.

In Example 21, the subject-matter of Example 20 may optionally further include analyzing the stored values of each of the groups; and adjusting the threshold value and/or a reset value of the resource usage counter in accordance with a result of the analysis.

In Example 22, the subject-matter of any of Examples 13 to 21 may optionally include that the arbiter is further configured to consider a ranking scheme for selecting one of the plurality of groups including the DMA channel requesting execution time for the evaluation of the value.

In Example 23, the subject-matter of any of Examples 15 to 22 may optionally include that the DMA circuit further includes a register and a storage mode indicator, wherein the register is configured for storing the counted resource usage until the value of the resource usage indicator reaches the threshold value, wherein the register is configured to store the counted delay time after the value of the resource usage indicator has reached the threshold value, and indicating, using the storage mode indicator, whether the register is presently configured as the resource usage counter or as the delay time counter.

Example 24 is a direct memory access (DMA) circuit. The DMA circuit may include a plurality of groups of direct memory access channels, wherein each of the groups includes at least one DMA channel and a resource usage determination circuit configured to determine an execution time in which a respective one of the DMA channels of the group is executed, and an arbiter configured to assign or deny execution time for using the direct memory access to one of the groups based on an indication of the resource usage determination circuit.

In Example 25, the DMA circuit of claim 24 may optionally include that the indication of the resource usage determination circuit includes an indication if the group has exceeded a predefined resource usage threshold value.

In Example 26, the DMA circuit of claim 24 may optionally include that the arbiter is configured to evaluate based on the indication of the resource usage determination circuit if the group has exceeded a predefined resource usage threshold value.

In Example 27, the subject-matter of Example 24 or 27 may optionally include that each group further includes a delay time counter configured to start counting when delaying execution time, and that the arbiter is further configured to compare a value of the delay time counter of the group with a predefined second threshold value, and, if the value is identical to or exceeds the second predefined threshold value, to assign the execution time to the group.

In Example 28, the subject-matter of Example 27 may optionally include that the second threshold value is individually preconfigurable for each of the groups.

In Example 29, the subject-matter of any of Examples 25 to 28 may optionally include that the threshold value is individually preconfigurable for each of the groups, optionally for each of the plurality of channels and/or for each application assigned to a specific channel of the plurality of channels.

In Example 30, the subject-matter of any of Examples 25 to 29 may optionally include that the DMA circuit is further configured to reset a value of the determined execution time for each of the groups after a predefined time interval, wherein the predefined time interval is larger than a time span defined by the predefined threshold value.

In Example 31, the subject-matter of Example 30 may optionally further include a memory element, wherein the DMA circuit is configured to store the value of each of the groups in the memory element before the reset of the value.

In Example 32, the subject-matter of Example 30 or 31 may optionally further include that the DMA circuit is configured to analyze the stored values of each of the groups and/or to provide the stored values to a processor for analysis, and to adjust the threshold value and/or a reset value of the resource usage counter in accordance with a result of the analysis.

In Example 33, the subject-matter of any of Examples 24 to 32 may optionally include that the arbiter is further configured to consider a ranking scheme for selecting one of the plurality of groups upon a request for execution time by one of the DMA channels of one of the plurality of groups for the evaluation of the value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A direct memory access (DMA) circuit, comprising:
a plurality of groups of direct memory access channels, wherein each of the groups comprises at least one DMA channel and a resource usage counter configured to count an execution time in which one of the DMA channels of the group is executed; and
an arbiter configured to evaluate a value of the resource usage counter of a group upon a request for execution time by one of the DMA channels of the group, and, taking into account a result of the evaluation, to assign, delay assignment, or deny execution time for using the direct memory access to one of the groups.

2. The DMA circuit of claim 1,
wherein the evaluating comprises comparing the value with a predefined threshold value.

3. The DMA circuit of claim 2, wherein the DMA circuit is further configured to reset the resource usage counter for each of the groups after a predefined time interval, and wherein the predefined time interval is larger than a time span defined by the predefined threshold value.

4. The DMA circuit of claim 3, further comprising:
a memory element;
wherein the DMA circuit is configured to store the value of each of the groups in the memory element before the reset of the resource usage counter.

5. The DMA circuit of claim 3,
wherein the DMA circuit is further configured to analyze the stored values of each of the groups and/or to provide the stored values to a processor for analysis, and to adjust the threshold value and/or a reset value of the resource usage counter in accordance with a result of the analysis.

6. The DMA circuit of claim 1, wherein each group further comprises a delay time counter configured to start counting when delaying execution time; and
wherein the arbiter is further configured to compare a value of the delay time counter of the group with a predefined second threshold value, and, if the value is identical to or exceeds the second predefined threshold value, to assign the execution time to the group.

7. The DMA circuit of claim 3,
further comprising a register and a storage mode indicator;
wherein the register is configured as the resource usage counter until the value of the resource usage indicator reaches the threshold value;
wherein the register is configured as the delay time counter after the value of the resource usage indicator has reached the threshold value; and
wherein the storage mode indicator is configured to indicate whether the register is presently configured as the resource usage counter or as the delay time counter.

8. The DMA circuit of claim 1,
wherein the resource usage counter is configured as a register.

9. A method of controlling a direct memory access (DMA) circuit comprising a plurality of groups of direct memory access channels, wherein each of the groups comprises at least one DMA channel, the method comprising:
counting an execution time in which one of the DMA channels of the group is executed;

evaluating the counted execution time of a group upon a request for execution time by one of the DMA channels of the group; and
taking into account a result of the evaluation, assigning, delaying assignment, or denying execution time for using the direct memory access to one of the groups.

10. The method of claim 9,
wherein the evaluating comprises comparing the value with a predefined threshold value.

11. The method of claim 10,
wherein each group further comprises a delay time counter; the method further comprising:
for the delaying the assigning of execution time to the group, comparing a value of the delay time counter of the first ranked group with a predefined second threshold value, and, if the value is identical to or exceeds the second predefined threshold value, assigning the execution time to the group.

12. The method of claim 11, wherein the DMA circuit further comprises a register and a storage mode indicator;
wherein the register is configured for storing the counted resource usage until the value of the resource usage indicator reaches the threshold value; and
wherein the register is configured to store the counted delay time after the value of the resource usage indicator has reached the threshold value; and
indicating, using the storage mode indicator, whether the register is presently configured as the resource usage counter or as the delay time counter.

13. The method of claim 10, further comprising:
individually preconfiguring the second threshold value for each of the groups.

14. The method of claim 10, further comprising:
individually preconfiguring the threshold value for each of the groups.

15. The method of claim 10, further comprising:
resetting the resource usage counter for each of the groups after a predefined time interval, wherein the predefined time interval is larger than a time span defined by the predefined threshold value.

16. The method of claim 15, wherein the DMA circuit further comprises a memory element, the method further comprising:
storing the value of the resource usage of each of the groups in the memory element before resetting the resource usage counter.

17. The method of claim 16, further comprising:
analyzing the stored values of each of the groups; and
adjusting the threshold value and/or a reset value of the resource usage counter in accordance with a result of the analysis.

18. A direct memory access (DMA) circuit, comprising:
a plurality of groups of direct memory access channels, wherein each of the groups comprises at least one DMA channel and a resource usage determination circuit configured to determine an execution time in which a respective one of the DMA channels of the group is executed; and
an arbiter configured to assign, delay assignment, or deny execution time for using the direct memory access to one of the groups based on an indication of the resource usage determination circuit.

19. The DMA circuit of claim 18,
wherein the indication of the resource usage determination circuit includes an indication if the group has exceeded a predefined resource usage threshold value.

20. The DMA circuit of claim 18,
wherein the arbiter is configured to evaluate based on the indication of the resource usage determination circuit if the group has exceeded a predefined resource usage threshold value.

* * * * *